(12) United States Patent
Carroll et al.

(10) Patent No.: US 7,581,130 B2
(45) Date of Patent: Aug. 25, 2009

(54) POWER MANAGEMENT SYSTEM AND METHOD

(75) Inventors: Barry Carroll, The Woodlands, TX (US); Lee Atkinson, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 424 days.

(21) Appl. No.: 10/987,560

(22) Filed: Nov. 12, 2004

(65) Prior Publication Data
US 2006/0103996 A1    May 18, 2006

(51) Int. Cl.
*G06F 11/30* (2006.01)
(52) U.S. Cl. ............................ 713/340; 713/300
(58) Field of Classification Search .............. 713/300, 713/340
See application file for complete search history.

(56) References Cited

U.S. PATENT DOCUMENTS

| 5,162,721 | A | 11/1992 | Sato et al. |
| 5,182,546 | A | 1/1993 | Shinbori et al. |
| 5,530,879 | A | 6/1996 | Crump et al. |
| 5,818,669 | A * | 10/1998 | Mader ............... 361/18 |
| 6,075,340 | A | 6/2000 | Koenck |
| 6,483,204 | B2 | 11/2002 | Hanaki |
| 6,498,460 | B1 | 12/2002 | Atkinson |
| 6,681,336 | B1 | 1/2004 | Nakazato et al. |
| 2002/0171398 | A1 | 11/2002 | Odaohhara |
| 2003/0126474 | A1 | 7/2003 | Sawyers et al. |
| 2004/0017884 | A1 | 1/2004 | Havrilla et al. |
| 2004/0018774 | A1 * | 1/2004 | Long et al. ......... 439/620 |

FOREIGN PATENT DOCUMENTS

| EP | 0551080 | 7/1993 |
| EP | 1294072 | 3/2003 |
| GB | 2239567 | 7/1991 |

\* cited by examiner

Primary Examiner—Tse Chen

(57) ABSTRACT

A power management system comprises a electronic device couplable to a power adapter. The electronic device is adapted to determine a power rating of the power adapter via an identifier associated with the power adapter and adjust at least one power-consuming activity of the electronic device based on the determined power rating.

28 Claims, 2 Drawing Sheets

POWER MANAGEMENT SYSTEM AND METHOD

BACKGROUND OF THE INVENTION

Portable electronic devices are generally configured to connect to a power adapter for converting an alternating current (AC) external line voltage or power supply to a lower direct current (DC) voltage. The adapter is used to facilitate operation of the electronic device via an external power supply instead of an internal battery power supply and/or charging of a rechargeable internal battery of the portable electronic device. However, the power adapter is generally bulky, heavy and awkward to carry and store. Additionally, because different electronic devices generally comprise different processors having different power capabilities and/or consumption demands, connecting an adapter to the electronic device having an insufficient power capability generally causes the adapter to "collapse" or fail which, in turn, causes the electronic device to "crash."

SUMMARY OF THE INVENTION

In accordance with one embodiment of the present invention, a power management system comprises a electronic device couplable to a power adapter. The electronic device is adapted to determine a power rating of the power adapter via an identifier associated with the power adapter and adjust at least one power-consuming activity of the electronic device based on the determined power rating.

In accordance with another embodiment of the present invention, a power management method comprises determining a power rating of a power adapter via an identifier associated with the power adapter. The method also comprises adjusting at least one power-consuming activity of the electronic device based on the power rating.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE DRAWINGS

Figure 1:
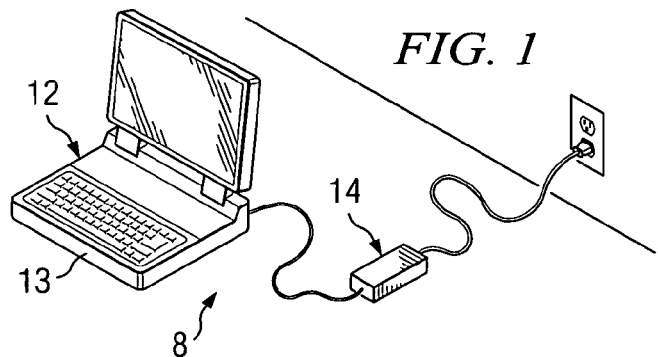
FIG. 1 is a diagram illustrating a portable computer system in which an embodiment of a power management system in accordance with the present invention may be incorporated.
Figure 3:
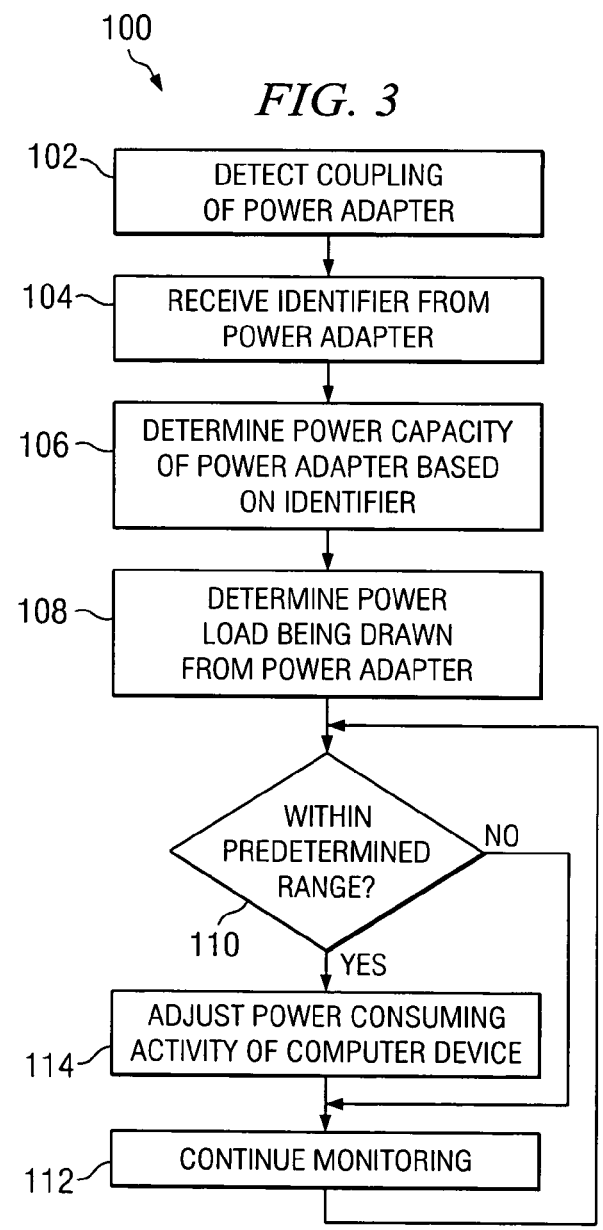
FIG. 3 is a flow diagram illustrating an embodiment of a power management method in accordance with the present invention.
Figure 2:
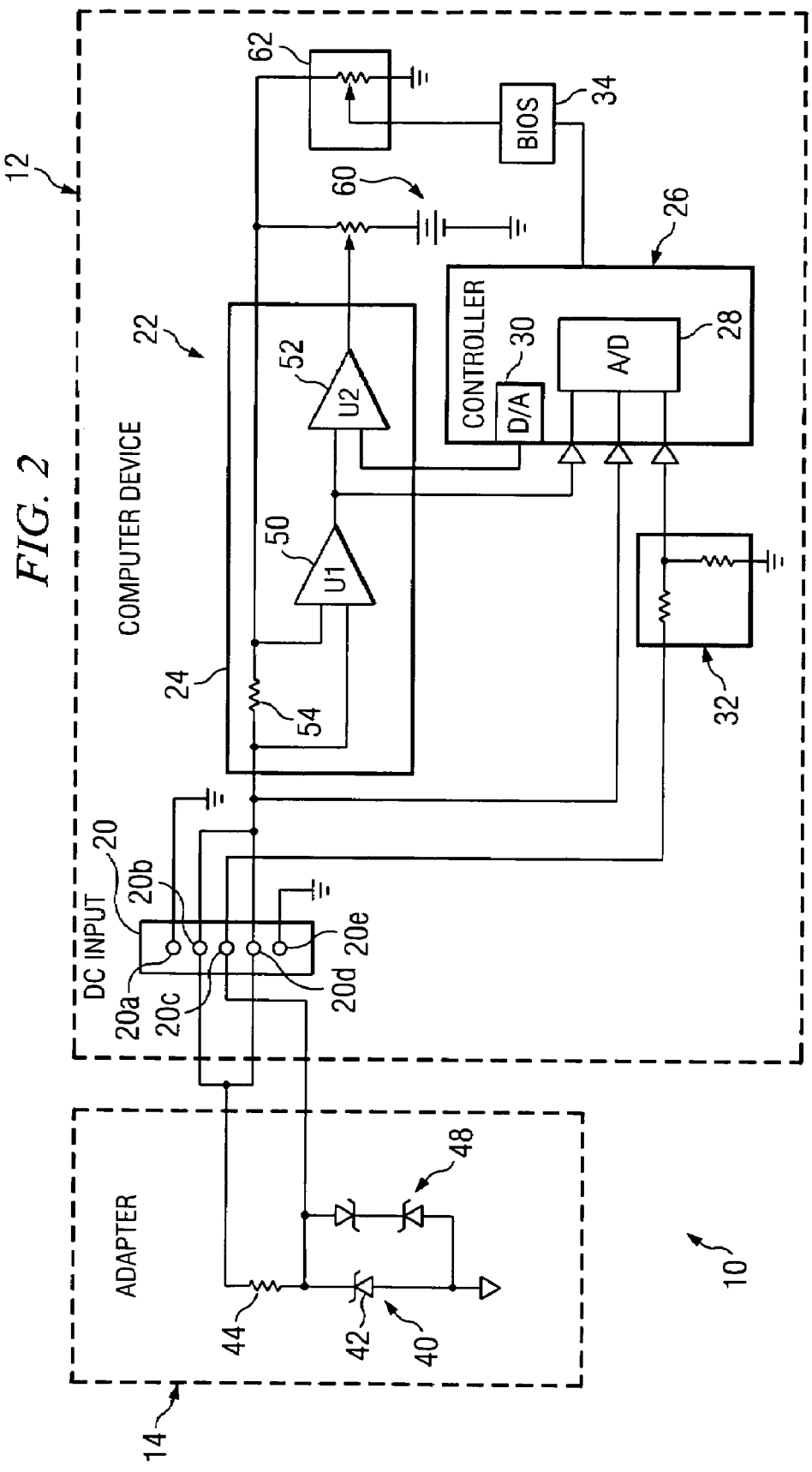
FIG. 2 is a diagram illustrating an embodiment of a power management system in accordance with the present invention.

The preferred embodiments of the present invention and the advantages thereof are best understood by referring to FIGS. 1-3 of the drawings, like numerals being used for like and corresponding parts of the various drawings.

FIG. 1 is a diagram illustrating an embodiment of an electronic system 8 in which embodiments of power management systems and methods of the present invention may be incorporated, and FIG. 2 is a diagram illustrating an embodiment of a power management system 10 in accordance with the present invention. In the embodiment illustrated in FIG. 1, electronic system 8 comprises an electronic device 12 coupled to an external power supply (e.g., a 110 or 220 alternating current (AC) outlet) via a power adapter 14. In the embodiment illustrated in FIG. 1, electronic device 12 comprises a laptop or a notebook computer 13; however, it should be understood that electronic device 12 may comprise other types of devices such as, but not limited to, telephones, electronic gaming devices, portable digital assistants, and scanners.

In the embodiment illustrated in FIG. 2, electronic device 12 comprises an direct current (DC) input connector 20 for coupling power adapter 14 to electronic device 12. In the embodiment illustrated in FIG. 2, electronic device 12 comprises a power management circuit 22. Connector 20 and/or power management circuit 22 may be disposed on a motherboard or elsewhere within electronic device 12. In the embodiment illustrated in FIG. 2, power management circuit 22 comprises a battery charge controller circuit 24, a controller 26 having an analog-to-digital (A/D) converter 28 and a digital-to-analog (D/A) converter 30, a voltage divider 32, and a basic input/output system (BIOS) 34. Controller 26, A/D converter 28, D/A converter 30 and BIOS 34 may comprise hardware, software or a combination of hardware and software.

In the embodiment illustrated in FIG. 2, connector 20 comprises five input pins or elements 20a-20e; however, it should be understood that connector 20 may comprise a greater or fewer quantity of input elements. In the embodiment illustrated in FIG. 2, input elements 20a and 20e are grounded, input element 20c is coupled to voltage divider 32 which, in turn, is coupled to A/D converter 28 of controller 26, and input elements 20b and 20d are coupled to battery charge controller circuit 24 and A/D converter 28 of controller 26. As illustrated in FIG. 2, power adapter 14 is coupled to electronic device 12 via connector elements 20b, 20c and 20d. In the embodiment illustrated in FIG. 2, power adapter 14 comprises an identifier circuit 40 for providing an identifier to electronic device 12 for determining and/or otherwise indicating a power rating of power adapter 14. For example, in the embodiment illustrated in FIG. 2, identifier circuit 40 comprises a zener diode 42 coupled to a resister 44 for providing a zener diode voltage level signal to electronic device 12 via connector element 20c of connector 20. In the embodiment illustrated in FIG. 2, power adapter 14 is illustrated as having an electrostatic charge dissipation (ESD) protection circuit 48. However, it should be understood that power adapter 14 may comprise other and/or additional circuitry. Power for operating electronic device 12 from power adapter 14 is supplied to electronic device 12 via input elements 20b and 20d.

In operation, controller 26 automatically determines a power rating of power adapter 14 based on an identifier associated with power adapter 14. In the embodiment illustrated in FIG. 2, such identifier is in the form of a zener diode voltage level provided by power adapter 14 via identifier circuit 40. For example, the zener diode voltage level is input to connector 20 via connector element 20c and is received as an input by A/D converter 28 of controller 26 via voltage divider 32. In operation, voltage divider 32 reduces and/or otherwise scales the zener diode voltage level downwardly to a reduced level to accommodate particular characteristics and/or requirements of controller 26. However, it should be understood that in some embodiments of the present invention, voltage divider 32 may be omitted. Thus, in operation, controller 26 accesses relational information (e.g., in the form of a relational database and/or other memory structure) and compares the zener diode voltage level, or a proportion and/or scaled value thereof, with the relational information to derive and/or otherwise determine a power rating of power adapter 14. For example, table 1 below illustrates an embodiment of relational information that may be used to determine a power rating of power adapter 14 based on a supplied zener diode voltage signal level:

TABLE 1

POWER ADAPTER IDENTIFIER

ZENER DIODE OUTPUT +/-5%

| ADAPTER POWER RATING | ZENER | MIN | NOM | MAX |
|---|---|---|---|---|
| 90 W | 5.1 | 4.8 | 5.1 | 5.4 |
| 120 W | 6.2 | 5.8 | 6.2 | 6.6 |
| 135 W | 7.5 | 7 | 7.5 | 7.9 |
| 160 W | 9.1 | 8.5 | 9.1 | 9.6 |
| 180 W | 11 | 10.4 | 11 | 11.6 |
| 240 W | 13 | 12.4 | 13 | 14.1 |
| 300 W | 16 | 15.3 | 16 | 17.1 | where the information in the "ADAPTER POWER RATING" column refers to the power rating of a particular power adapter 14, the information in the "ZENER" column represents a particular size and/or voltage level associated with a zener diode in the circuit 40 of a particular power adapter 14 for the corresponding power rating of the power adapter 14, and the remaining columns represent a range of values associated with each particular zener diode voltage output. Thus, in operation, for example, a voltage level reading associated with connector element 20c within the range from 7 to 7.9 volts indicates that a power adapter 14 with a 135 Watt power rating is coupled to the electronic device 12.

In the embodiment illustrated in FIG. 2, power for operating electronic device 12 is provided by power adapter 14 via input elements 20a and 20d. In the embodiment illustrated in FIG. 2, operating power from power adapter 14 is also fed to A/D converter 28 of controller 26 and battery charge controller circuit 24. For example, in the embodiment illustrated in FIG. 2, battery charge controller circuit 24 comprises comparators 50 and 52. Comparator 50 is coupled to each side of a resistor 54 for determining a current level and/or power draw from power adapter 14 by electronic device 12. The output of comparator 50 is coupled to A/D converter 28 of controller 26 and also as an input of comparator 52.

In operation, controller 26 compares the power being drawn from power adapter 14 with a power rating of power adapter 14 (e.g., based on the identifier provided by and/or otherwise received from power adapter 14). For example, in the embodiment illustrated in FIG. 2, based on a signal received from circuit 40 of power adapter 14 (e.g., a zener diode voltage level), controller 26 derives, determines and/or otherwise identifies a power rating of power adapter 14. Based on the level of power being drawn from power adapter 14 relative to the power rating of power adapter 14, controller 26 automatically adjusts, controls, regulates and/or otherwise throttles at least one power-consuming activity of the electronic device 12 (e.g., a power-consuming process, state or application) such as, but not limited to: increasing or decreasing a processor clock frequency; increasing, decreasing or interrupting current supplied to an internal battery for recharging; adjusting the intensity of a display element (e.g., a liquid crystal display); hiding and/or otherwise suspending the display of an image or icon; suspending or interrupting the running or processing of an application; or changing an operating mode or state of an application or element (e.g., to a suspend or sleep mode).

In the embodiment illustrated in FIG. 2, controller 26 is coupled to BIOS 34 and communicates with and/or otherwise causes BIOS 34 to vary a power-consuming activity of electronic device 12. In some embodiments of the present invention, one such power-consuming activity is a clock frequency of a central processor unit (CPU) 62. Thus, in operation, as the power being drawn from power adapter 14 varies relative to the power rating of power adapter 14, controller 26 communicates with BIOS 34 to cause BIOS 34 to adjust (e.g., increase and/or decrease a clock frequency) of CPU 62. For example, if the power being drawn from power adapter 14 rises above a predetermined threshold in some embodiments, or alternatively, within a predetermined range of power provided by adapter 14 in other embodiments, controller 26 communicates with BIOS 34 in the present example to decrease the clock frequency of CPU 62. Conversely, if the power being drawn from power adapter 14 falls below a predetermined threshold in some embodiments, or alternatively, within a predetermined range of power provided by adapter 14 in other embodiments, controller 26 communicates with BIOS 34 to increase the clock frequency of CPU 62. As the power being drawn by electronic device 12 fluctuates depending upon the number and extent of power-consuming activities electronic device 12 is performing, the amount of power drawn will rise and fall. Thus, controller 26 monitors the amount of power drawn and accordingly adjusts at least one power-consuming activity. In the embodiment illustrated in FIG. 2, CPU 62 is illustrated as a variable resistor for illustrative purposes only. It should be understood that CPU 62 may be otherwise represented.

In the embodiment illustrated in FIG. 2, controller 26 also outputs information associated with the power rating of power adapter 14 to comparator 52 via D/A converter 30. Comparator 52 compares the power being drawn from power adapter 14 as input from comparator 50 with information provided by controller 26 relating to the power rating of power adapter 14 for determining a current level provided to a rechargeable internal battery 60 of electronic device 12 for adjusting and/or otherwise controlling the current level provided to battery 60 for recharging. For example, in operation, as the power being drawn from power adapter 14 rises above a predetermined threshold in some embodiments, or alternatively, within a predetermined range relative to a power rating of power adapter 14, the current level provided to battery 60 for recharging of battery 60 is reduced and/or suspended. Additionally, it should be understood that more than one power-consuming activity of electronic device 12 may be regulated in accordance with the present invention (e.g., distributing and/or otherwise balancing the CPU 62 processor speed with the current level provided to battery 60 for recharging).

Thus, in operation, controller 26 determines a power rating of power adapter 14 via an identifier provided by power adapter 14 for adjusting, regulating and/or otherwise throttling various power-consuming activities of electronic device 12, thereby adjusting power consumption of the electronic device 12 based on the power rating of the power adapter 14. For example, in the described embodiment, the identifier is in the form of a zener diode voltage level provided by circuit 40 of adapter 14. However, the identifier may be otherwise provided (e.g., a current level, digital signal, or otherwise). Additionally, in the embodiment illustrated in FIG. 2, regulating and/or throttling of CPU 62 is performed via BIOS 34. However, it should be understood that regulating and/or throttling a clock frequency of CPU 62 and/or any other power-consuming activity of electronic device 12 may be otherwise performed.

In some embodiment of the present invention, system 10 is dynamically configured to accommodate and/or otherwise respond to changes in the power rating of power adapter 14. For example, in some embodiments of the present invention, the signal value and/or level of the identifier of power adapter 14 indicating the power rating of power adapter 14 is dynamic based on changes and/or conditions of power adapter 14 (e.g., overheating and/or other conditions generally associated with power adapter 14 affecting the power available from and/or otherwise provided by power adapter 14). Thus, in operation, in response to a change in the identifier, controller 26 detects the change in the identifier and automatically adjusts a power-consuming activity of electronic device 12 based on the change in power available from power adapter 14. In some embodiments of the present invention, the identifier indicating an/or otherwise associated with the power rating of power adapter 14 is provided and/or monitored continuously or periodically. However, it should be understood that in other embodiments of the present invention, the identifier indicating an/or otherwise associated with the power rating of power adapter 14 is provided and/or monitored once (e.g., upon initial engagement of power adapter 14 with electronic device 12).

FIG. 3 is a flow diagram illustrating an embodiment of a power management method 100 in accordance with the present invention. The method begins at block 102, where controller 26 detects coupling of power adapter 14 to electronic device 12. Detection of coupling of power adapter 14 to electronic device may be performed and/or otherwise determined via hardware, software and/or otherwise (e.g., detection of a voltage and/or current input signal level via one of connector elements 20). However, it should be understood that detecting coupling of power adapter 14 to electronic device 12 may be otherwise determined.

At block 104, controller 26 automatically checks for and/or otherwise receives an identifier from power adapter 14 indicating and/or otherwise relating to a power rating of power adapter 14. For example, as described above, a zener diode voltage level and/or a proportion or scaled value thereof is used by controller 26 to determine and/or otherwise derive the power rating of power adapter 14. At block 106, controller 26 determines the power rating of power adapter 14 via the received identifier. At block 108, controller 26 determines the power load being drawn from power adapter 14 by electronic device 12.

At decisional block 110, a determination is made whether the power load being drawn from power adapter 14 is within a predetermined range relative to the power rating of power adapter 14. If the power load being drawn from power adapter 14 is not within a predetermined range relative to the power rating of power adapter 14, the method proceeds to block 112, where controller 26 continues monitoring the load relative to the power rating of power adapter 14. If the load being drawn from power adapter 14 is within a predetermined range relative to the power rating of power adapter 14, the method proceeds to block 114, where controller 26, battery charge controller circuit 24 and/or another circuit or system of electronic device 12 adjusts, throttles and/or otherwise causes to be adjusted or throttled a power-consuming activity of electronic device 12. For example, as described above, battery charge controller circuit 24 regulates and/or otherwise throttles the level of current supplied to battery 60 for recharging and/or controller 26 regulates and/or otherwise throttles a clock frequency of CPU 62. The method continues to block 112 where controller 26 continues monitoring the load relative to the power rating of power adapter 14.

Thus, embodiments of the present invention enable an automatic identification and/or determination of the power rating of power adapter 14 by electronic device 12 to facilitate control of various operating parameters of electronic device 12 within the power rating available from the power adapter 14. Thus, in operation, electronic device 12 is configured to automatically adapt to different types/levels of power adapters 14. It should be understood that in the embodiment of the method of the present invention described in FIG. 3, certain functions may be omitted, combined, or accomplished in a sequence different than depicted in FIG. 3. Also, it should be understood that the method depicted in FIG. 3 may be altered to encompass any of the other features or aspects described elsewhere in the specification.

What is claimed is:

1. A power management system, comprising:
an electronic device coupable to a power adapter, the electronic device performing a software detection to determine a coupling of a power adapter with an electronic device, the electronic device, in response to detecting the coupling, automatically determining a power rating of the power adapter via an identifier comprising a voltage level associated with a zener diode of the power adapter, the electronic device dynamically adjusting at least one power rating and a power draw of the electronic device from the power adapter, the electronic device repetitively monitoring the power rating to determine a change in power provided by the power adapter.

2. The system of claim 1, wherein the electronic device adjusts a clock frequency of a processor of the electronic device based on the determined power rating.

3. The system of claim 1, wherein the electronic device adjusts charging of a battery of the electronic device based on the determined power rating.

4. The system of claim 1, wherein the identifier comprises a voltage identifier.

5. The system of claim 1, wherein the electronic device derives the power rating of the power adapter from the identifier.

6. The system of claim 1, wherein the identifier comprises a voltage level proportional to the power rating of the power adapter.

7. The system of claim 1, wherein the electronic device compares a power draw of the electronic device from the power adapter with the power rating of the power adapter.

8. The system of claim 1, wherein the electronic device adjusts at least one power-consuming activity of the electronic device if a power draw of the electronic device from the power adapter comes within a predetermined range of the power rating.

9. The system of claim 1, wherein the electronic device detects a change in the identifier indicating a change to the power rating of the power adapter.

10. The system of claim 1, wherein the electronic device continuously monitors the identifier associated with the power adapter.

11. The system of claim 1, wherein the electronic device periodically monitors the identifier associated with the power adapter.

12. A power management method, comprising:
performing a software detection to determine a coupling of a power adapter with an electronic device;
in response to detecting the coupling, automatically determining a power rating of the power adapter via an identifier comprising a voltage level associated with a zener diode of the power adapter;

dynamically adjusting at least on power-consuming activity of the electronic device based on the power rating and a power draw of the electronic device from the power adapter; and repetitively monitoring the power rating to determine a change in power provided by the power adapter.

13. The method of claim 12, further comprising detecting a change in the identifier indicating a change to the power rating of the power adapter.

14. The method of claim 12, wherein adjusting comprises adjusting at least one power-consuming activity of the electronic device when a power draw on the power adapter is within a predetermined range of the power rating.

15. The method of claim 12, further comprising deriving the power rating of the power adapter from the identifier.

16. The method of claim 12, further comprising receiving the identifier from the power adapter.

17. The method of claim 12, wherein adjusting comprises throttling a clock frequency of a processor of the electronic device.

18. The method of claim 12, wherein adjusting comprises throttling charging of a battery of the electronic device based on the power rating of the power adapter.

19. The method of claim 12, wherein determining the power rating of the power adapter comprises evaluating a voltage identifier received from the power adapter.

20. The method of claim 12, further comprising continuously monitoring the identifier associated with the power adapter.

21. The method of claim 12, further comprising periodically monitoring the identifier associated with the power adapter.

22. A power management system, comprising:

an electronic device controller that performs a software detection to determine a coupling of a power adapter with an electronic device, the electronic device controller, in response to detecting the coupling, automatically compares a power draw from the power adapter couplable to the electronic device with a power rating for the power adapter, wherein the controller determines the power rating of the power adapter using an identifier comprising a voltage level associated with a zener diode for the adapter, the electronic device controller repetitively monitoring the power rating to determine a change in power provided by the power adapter, and wherein the controller regulates at least one power-consuming activity of the electronic device based on the power draw exceeding a predetermined threshold.

23. The system of claim 22, wherein the identifier comprises a signal identifying a voltage level.

24. The system of claim 22, wherein the identifier is an alternating current signal associated with the power adapter.

25. The system of claim 22, wherein the controller processes an alternating current signal representing the identifier associated with the power adapter.

26. The system of claim 22, wherein the controller regulates a current power level used for recharging of a battery in the electronic device in response to the power exceeding the pre-determined threshold.

27. The system of claim 22, wherein the controller regulates a current power level used for recharging of a battery in the electronic device in response to the power exceeding the pre-determined threshold.

28. The system of claim 1, wherein the electronic device includes a laptop computer.

* * * * *

UNITED STATES PATENT AND TRADEMARK OFFICE
CERTIFICATE OF CORRECTION

PATENT NO.        : 7,581,130 B2                                          Page 1 of 1
APPLICATION NO. : 10/987560
DATED             : August 25, 2009
INVENTOR(S)       : Barry Carroll et al.

It is certified that error appears in the above-identified patent and that said Letters Patent is hereby corrected as shown below:

In column 6, line 19, in Claim 1, delete "coupable" and insert -- couplable --, therefor.

In column 7, line 3, in Claim 12, delete "on" and insert -- one --, therefor.

In column 8, lines 6-7, in Claim 22, delete "coupable" and insert -- couplable --, therefor.

Signed and Sealed this

Twentieth Day of April, 2010

David J. Kappos
*Director of the United States Patent and Trademark Office*